US010608687B2

(12) United States Patent
Kuramochi et al.

(10) Patent No.: US 10,608,687 B2
(45) Date of Patent: Mar. 31, 2020

(54) WIRELESS COMMUNICATION SYSTEM FOR ENABLING PLAYBACK OF TRANSMITTED VOICE AND CONTROLLED INTERRUPTION THEREOF

(71) Applicant: JVC KENWOOD Corporation, Yokohama-shi, Kanagawa (JP)

(72) Inventors: Yutaka Kuramochi, Yokohama (JP); Rikiya Kasahara, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 0 days.

(21) Appl. No.: 16/353,097

(22) Filed: Mar. 14, 2019

(65) Prior Publication Data

US 2019/0296785 A1 Sep. 26, 2019

(30) Foreign Application Priority Data

Mar. 23, 2018 (JP) .................................. 2018-057260

(51) Int. Cl.
| | | |
|---|---|---|
| *H04B 1/38* | (2015.01) | |
| *G10L 21/04* | (2013.01) | |
| *G10L 15/22* | (2006.01) | |
| *H04B 7/005* | (2006.01) | |
| *H04M 1/65* | (2006.01) | |
| *H04L 5/16* | (2006.01) | |
| *H04M 1/656* | (2006.01) | |

(52) U.S. Cl.
CPC ................ *H04B 1/38* (2013.01); *G10L 15/22* (2013.01); *G10L 21/04* (2013.01); *H04B 7/005* (2013.01); *H04L 5/16* (2013.01); *H04M 1/6505* (2013.01); *H04M 1/656* (2013.01)

(58) Field of Classification Search
CPC ........... H04B 1/38; H04B 7/005; G10L 15/22; G10L 21/04; H04L 5/16; H04L 65/4061; H04M 1/6505; H04M 1/656; H04W 4/10; H04W 76/45
See application file for complete search history.

(56) References Cited

U.S. PATENT DOCUMENTS

| | | | | |
|---|---|---|---|---|
| 6,574,422 B1* | 6/2003 | Kikuchi | ................. | G11B 19/04 |
| | | | | 386/248 |
| 9,277,373 B2* | 3/2016 | Kerger | .................... | H04W 4/10 |
| 2004/0121790 A1* | 6/2004 | Wolff | .................... | G06F 16/685 |
| | | | | 455/518 |

(Continued)

FOREIGN PATENT DOCUMENTS

JP 11-331320 11/1999

*Primary Examiner* — Devan A Sandiford
(74) *Attorney, Agent, or Firm* — Amin, Turocy & Watson, LLP

(57) ABSTRACT

A radio device comprising: a transmitter that transmits a transmission voice; a receiver that receives a reception voice; a recorder that records the reception voice; a playback controller that performs rewind playback of a reception voice recorded in the recorder during the reception voice being received; and a transmit-receive controller that causes the transmitter to transmit the under playback signal to notify that it is during the rewind playback when it is detected that reception of the reception voice is completed during the rewind playback, and that causes the transmitter to transmit a playback end signal indicating that the rewind playback is finished when the rewind playback is finished.

4 Claims, 8 Drawing Sheets

(56) References Cited

U.S. PATENT DOCUMENTS

| | | | |
|---|---|---|---|
| 2006/0040689 A1* | 2/2006 | Yoon | H04W 76/45 |
| | | | 455/518 |
| 2006/0088000 A1* | 4/2006 | Hannu | H04L 49/90 |
| | | | 370/328 |
| 2007/0162569 A1* | 7/2007 | Robinson | H04L 12/1818 |
| | | | 709/219 |
| 2007/0230910 A1* | 10/2007 | Welch | G08C 17/02 |
| | | | 386/230 |
| 2011/0201379 A1* | 8/2011 | Jastram | G06F 3/0338 |
| | | | 455/550.1 |
| 2014/0267543 A1* | 9/2014 | Kerger | H04W 4/21 |
| | | | 348/14.02 |

* cited by examiner

WIRELESS COMMUNICATION SYSTEM FOR ENABLING PLAYBACK OF TRANSMITTED VOICE AND CONTROLLED INTERRUPTION THEREOF

CROSS-REFERENCE TO RELATED APPLICATIONS

This application claims priority from Japanese Application No. 2018-057260, filed on Mar. 23, 2018, the contents of which are incorporated by reference herein in its entirety.

BACKGROUND

1. Technical Field

The present disclosure relates to a radio device.

2. Description of the Related Art

In press-to-talk communication such as half-duplex communication, a technique of letting a speaker know response timing of a listener to enable smooth conversation has been disclosed (for example, JP-A-11-331320).

However, in wireless communication by half-duplex communication, there is a problem that a communication channel is occupied if a voice being heard by a listener is provided to the speaker. Moreover, during the speaker waiting for a response, when a situation in which the speaker wants to correct a speech, or in which the speaker wants to tell something urgently occurs, the listener cannot receive it because the listener is in the course of transmission.

SUMMARY

It is an object of the present disclosure to at least partially solve the problems in the conventional technology.

A radio device according to a first embodiment of the present disclosure includes a transmitter that transmits a transmission voice, a receiver that receives a reception voice, a recorder that records the reception voice, a playback controller that performs rewind playback of a reception voice recorded in the recorder during the reception voice being received, and a transmit-receive controller that causes the transmitter to transmit an under playback signal to notify that it is during the rewind playback when it is detected that reception of the reception voice is completed during the rewind playback, and that causes the transmitter to transmit a playback end signal indicating that the rewind playback is finished when the rewind playback is finished.

A radio device according to a second embodiment of the present disclosure includes a transmitter that transmits a transmission voice to a receiver side, a receiver that receives a reception voice from the receiver side, and a transmit-receive controller that causes the transmitter to transmit the transmission voice with an interrupt signal added thereto when the under playback signal indicating that a recorded voice signal is being played back on the receiver side is received, the interrupt signal causing the receiver side to perform reception by interrupting the playback.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Hereinafter, an embodiment of the present disclosure is described in detail with reference to the drawings. The embodiment of the present disclosure can be suitably used for communication devices, such as a professional radio device and an amateur radio device. Like reference symbols are assigned to like or corresponding parts throughout the drawings, and description is appropriately omitted.

Figure 1:
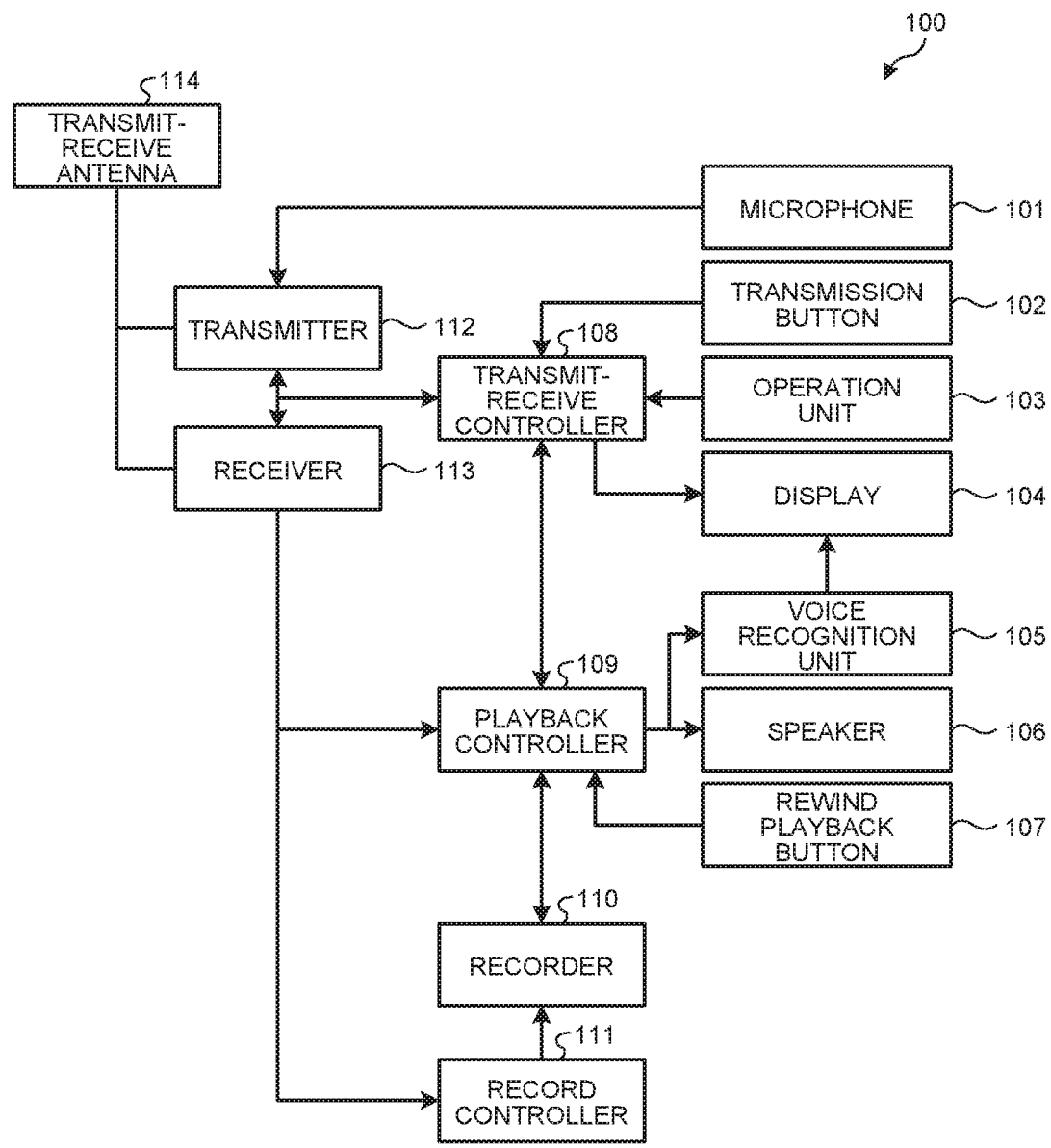
FIG. 1 is a block diagram showing a configuration of a radio device according to an embodiment of the present disclosure.

A radio device according to an embodiment of the present disclosure is described by using FIG. 1. FIG. 1 is a block diagram showing an example of a radio device according to the embodiment of the present disclosure.

As shown in FIG. 1, a radio device 100 includes a microphone 101, a transmission button 102, an operation unit 103, a display 104, a voice recognition unit 105, a speaker 106, a rewind playback button 107, a transmit-receive controller 108, a playback controller 109, a recorder 110, a record controller 111, transmitter 112, a receiver 113, and a transmit-receive antenna 114.

First, respective components included in the radio device 100 are briefly described before describing a specific action of the radio device 100.

The microphone 101 acquires a voice of a user of the radio device 100. Specifically, the microphone 101 acquires a voice of the user all the time during the radio device 100 is in a transmission mode.

The transmission button 102 is a button to switch the radio device 100 between a reception mode and the transmission mode. Specifically, the radio device 100 is in the transmission mode during when the transmission button 102 is pressed by the user, and is in the reception mode when the transmission button 102 is released by the user.

The operation unit 103 is a button to operate various kinds of functions of the radio device 100. The user can cause the radio device 100 to perform various kinds of functions by operating the operation unit 103. For example, the user can set transmit-receive conditions of the radio device 100 by operating the operation unit 103. For example, the user can switch, when a party on the other end is performing rewind playback, to an interrupt mode by operating the operation unit 103. The interrupt mode enables the user to tell contents of information to a receiving side by interrupting a voice in the rewind playback.

The display 104 displays, for example, a communication status of the radio device 100, or a setting state of the radio device 100. The display 104 can be implemented, for example, by an ordinary display, such as a liquid crystal display (LCD) and an organic electroluminescence (EL) display.

The voice recognition unit 105 performs processing to recognize a voice, for example, from voice data recorded by the recorder 110. The voice recognition unit 105 displays the recognized voice in a character string on the display 104.

The speaker 106 is a device that outputs voices. The speaker 106 outputs, for example, a voice of a party on the other end when the radio device 100 is communicating with the party on the other end. The speaker 106 outputs, for example, a voice in rewind playback.

The rewind playback button 107 is a button to cause the radio device 100 to perform rewind playback. It is described specifically later, but rewind playback is performed by pressing the rewind playback button 107 during a voice output from the speaker 106 in the present embodiment.

The transmit-receive controller 108, the playback controller 109, and the record controller 111 control respective components included in the radio device 100. Specifically, the transmit-receive controller 108, the playback controller 109, and the record controller 111 control the respective components included in the radio device 100 by developing and executing programs recorded in the recorder 110. The transmit-receive controller 108, the playback controller 109, and the record controller 111 can be implemented by an electronic circuit, such as a central processing unit (CPU).

The recorder 110 records control programs for transmit-receive controller 108, the playback controller 109, and the record controller 111 to control the respective components. The recorder 110 records a reception voice received by the radio device 100 to perform rewind playback. The recorder 110 is a recording device, such as a semiconductor memory device including a random access memory (RAM), a read-only memory (ROM), and a flash memory, a hard disk, a solid state drive, and an optical disk. The recorder 110 may be an external recording device connected in a wireless or wired manner, or the like.

The transmitter 112 modulates a voice acquired by the microphone 101 or an identification (ID) to identify a party on the other end. The transmitter 112 transmits the modulated signal to the party on the other end though the transmit-receive antenna 114 as a transmission voice. The receiver 113 demodulates a reception voice that is transmitted from the party on the other end through the transmit-receive antenna 114. The transmit-receive antenna 114 transmits a transmission voice to the party on the other end as a radio wave. The transmit-receive antenna 114 receives a radio wave transmitted from the party on the other end as a reception voice.

Next, an action of the radio device 100 in the reception mode is described.

In the reception mode, the radio device 100 receives a radio wave by the transmit-receive antenna 114 as a reception voice. The radio device 100 demodulates the reception voice by the receiver 113. The receiver 113 outputs the demodulated reception voice to the transmit-receive controller 108, the playback controller 109, and the record controller 111.

The playback controller 109 outputs the reception voice received from the receiver 113 from the speaker 106 as a voice.

The radio device 100 performs rewind playback when a receiving side presses the rewind playback button 107 connected to the playback controller 109 while a voice is being output from the speaker 106. The rewind playback is to rewind, by a period of time for which the rewind playback button 107 is being pressed (hereinafter, referred to as "rewinding time"), a write position in the recorder 110 to which voice data is being written by the record controller 111, and playback voice data at the rewound position. Specifically, the playback controller 109 outputs a playback voice that is recorded in the recorder 110 from the speaker 106 instead of a voice signal that is input by the receiver 113 when the rewind playback button 107 is pressed by the receiving side. Thus, the receiving side can hear a reception voice that has been received before. The playback controller 109 may input voice data between a write position of the recorder 110 and a read position of the recorder 110 to the voice recognition unit 105. In this case, the voice recognition unit 105 converts the voice data into character string data by voice recognition to display on the display 104.

When detecting that a radio wave (a reception voice) from a sending side has been completed during the rewind playback, the transmit-receive controller 108 generates a code (hereinafter, referred to as "under playback signal") to inform that it is under rewind playback. The transmit-receive controller 108 transmits the generated under playback signal to the sending side from the transmitter 112. The transmit-receive controller 108 generates a code (hereinafter, referred to as "playback end signal") to inform that the rewind playback is finished when the rewind playback is finished. The transmit-receive controller 108 transmits the generated playback end signal to the sending side from the transmitter 112 when the rewind playback is finished. The transmit-receive controller 108 checks whether a code (hereinafter, referred to as "interrupt signal") indicating interrupt transmission is included in a reception voice when a new radio wave is received during a period from when the under playback signal is transmitted until when the playback end signal is transmitted.

The playback controller 109 suspends the rewind playback when the interrupt signal is added to the reception voice, and outputs the reception voice to which the interrupt signal is added from the speaker 106 (hereinafter, referred to as "interrupt playback"). When reception of the interrupt signal is finished, the playback controller 109 restarts the rewind playback from a position at which the playback is suspended due to reception of the interrupt signal. On the other hand, when the interrupt signal is not included in the reception voice, the playback controller 109 continues the rewind playback without outputting the reception voice from the speaker 106. In this case, the record controller 111 records the received reception voice to be continued to the last part of a record in a memory that has been recorded in the recorder 110 (hereinafter, referred to as "addition mode").

The record controller 111 records a reception voice received from the receiver 113 in the recorder 110. The reception voice output by the receiver 113 may be an analog signal, or encoded compressed voice data. That is, reception voices output by the receiver 113 is not particularly limited.

Next, the transmission mode of the radio device 100 is described.

When the sending side presses the transmission button 102 in the transmission mode, the transmit-receive controller 108 is instructed to start transmission of a transmission voice. Thus, the radio device 100 is switched from the reception mode to the transmission mode. In this case, the transmit-receive controller 108 controls the transmitter 112 to modulate a signal as necessary, such as an ID number to identify a party on the other end and a voice input from the microphone 101 to transmit thereto. The transmit-receive controller 108 transmits a signal as necessary, such as an ID number, and a voice input from the microphone 101 to a receiver side through the transmit-receive antenna 114 as a transmission voice.

When detecting the under playback signal from the reception signal received by the transmit-receive antenna 114 after transmission is completed, the transmit-receive controller 108 controls the playback controller 109 to output a notification tone from the speaker 106 to notify that the party on the other end is during the rewind playback. At the same time, the transmit-receive controller 108 displays a marker or the like to notify that it is during the rewind playback on the display 104. The transmit-receive controller 108 may perform either one out of notification by the speaker 106 and notification by the display 104.

When detecting the playback end signal from a reception signal received through the transmit-receive antenna 114, the transmit-receive controller 108 controls the playback controller 109 to output a notification tone to notify that the party on the other end has ended rewind playback from the speaker 106. At the same time, the transmit-receive controller 108 hides the marker indicating that it is during rewind playback from the display 104.

When the party on the other end is in rewind playback, normally, the sending side is to wait until the rewind playback ends. However, in the present embodiment, when a need for transmitting an additional transmission voice occurs, it is possible to switch to the interrupt mode by operating the operation unit 103 even in the rewind playback by the receiving side. The sending side can interrupt the voice under rewind playback and tell the receiving side about contents of the transmission voice by pressing the transmission button 102 and transmitting the transmission voice after switching to the interrupt mode.

Specifically, when the transmission button 102 is pressed by the sending side, and a voice is input through the microphone 101 in a state in which the radio device 100 is in the interrupt mode, the transmit-receive controller 108 adds the interrupt signal to the transmission voice. The transmit-receive controller 108 modulates the transmission voice to which the interrupt signal is added by the transmitter 112. Subsequently, the transmit-receive controller 108 sends the transmission voice to which the interrupt signal is added through the transmit-receive antenna 114 to the receiver side.

As described above, on the receiver side receiving the interrupt signal, the rewind playback is suspended, and the reception voice including the interrupt signal is output from the speaker 106. On the other hand, when the sending side performs transmission to the transmit-receive controller 108 without switching to the interrupt mode by the operation unit 103, the transmission voice is transmitted without the interrupt signal added. In this case, the received reception voice is to be recorded to be continued to the last part of a memory-recorded voice that has already been recorded in the recorder 110 on the receiver side. Thus, a transmission voice without the interrupt signal added is provided to the receiving side after the rewind playback is finished, in a continuing manner.

Figure 3:
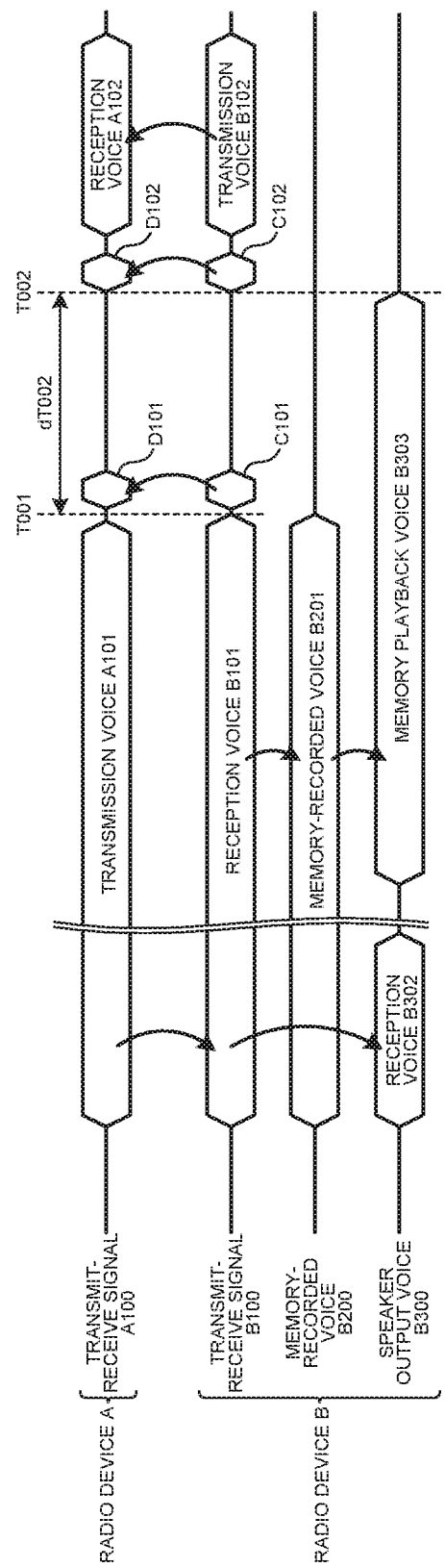
FIG. 3 is a time chart showing an example of an action in performing rewind playback.
Figure 4:
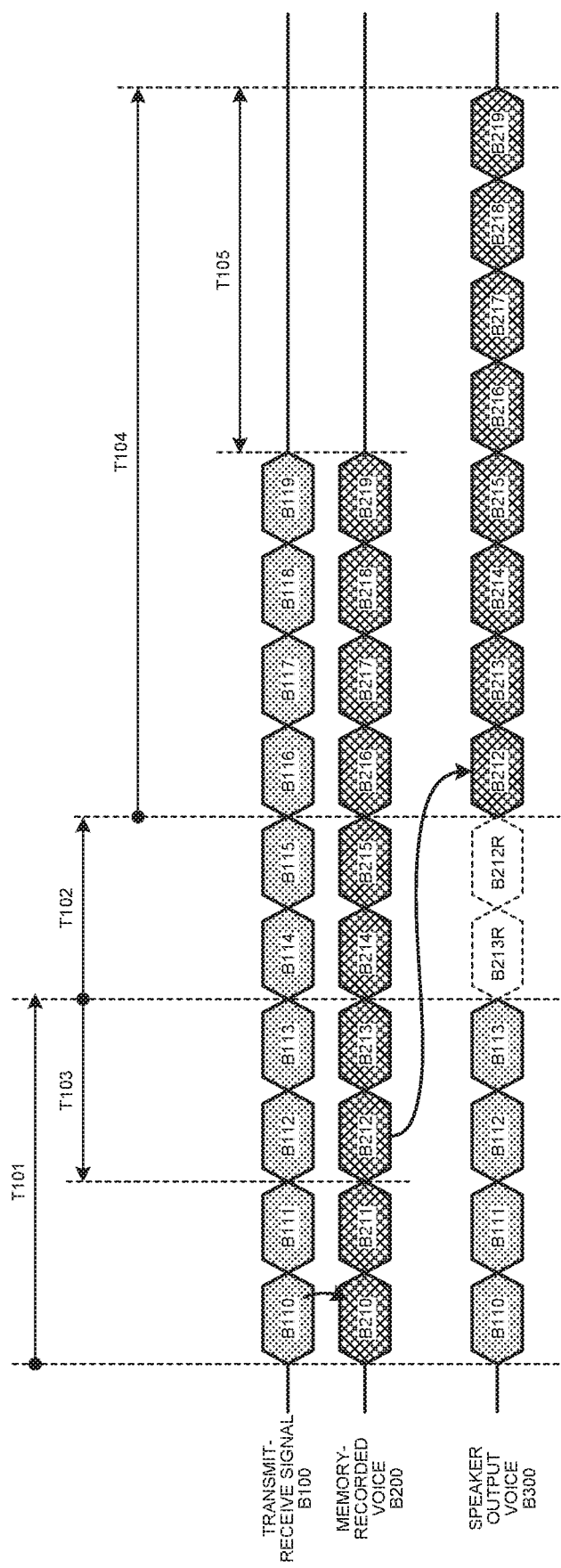
FIG. 4 is a diagram showing voice data.
Figure 5:
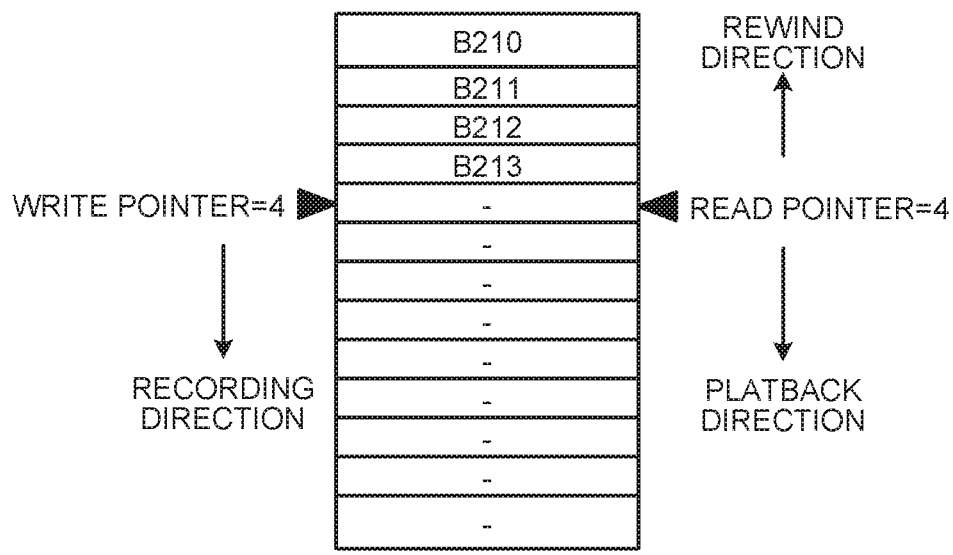
FIG. 5 is a diagram showing a state in which voice data is recorded in a recorder 110.
Figure 6:
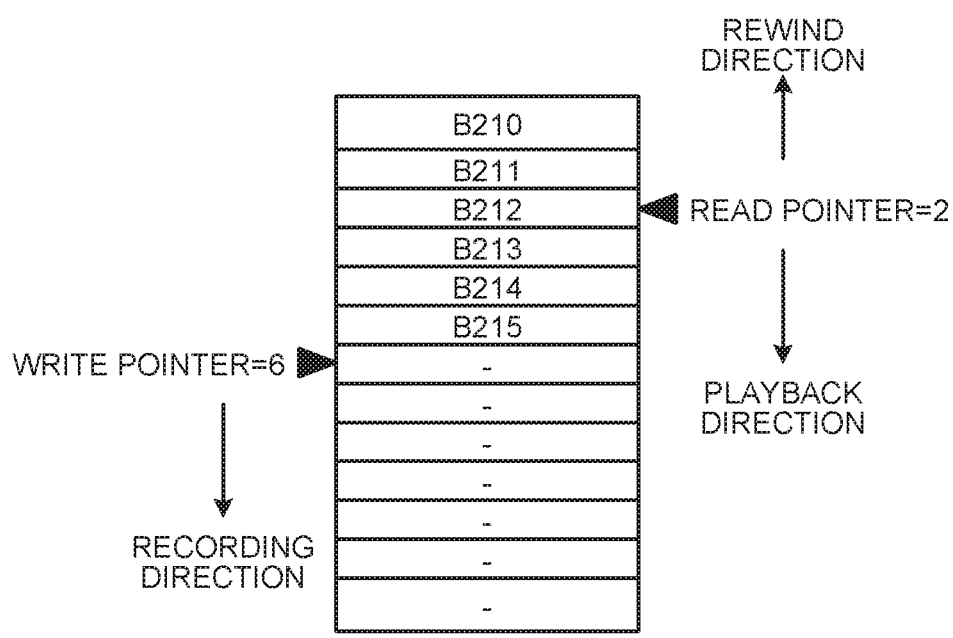
FIG. 6 is a diagram showing a state in which voice data is recorded in the recorder 110.

Next, actions in the rewind playback, in the interrupt mode, and in the addition mode are described by using FIG. 2 to FIG. 9. FIG. 2 to FIG. 4, and FIG. 7 to FIG. 9 are time charts showing actions of the radio device, and horizontal axes are for time therein. FIG. 5 is a diagram showing a state in which voice data is recorded in the recorder 110. FIG. 6 is a diagram showing a state in which voice data is recorded in the recorder 110. In FIG. 2 to FIG. 9, signals, times, and time periods in common thereamong are designated by common symbols, and description is omitted appropriately.

Figure 2:
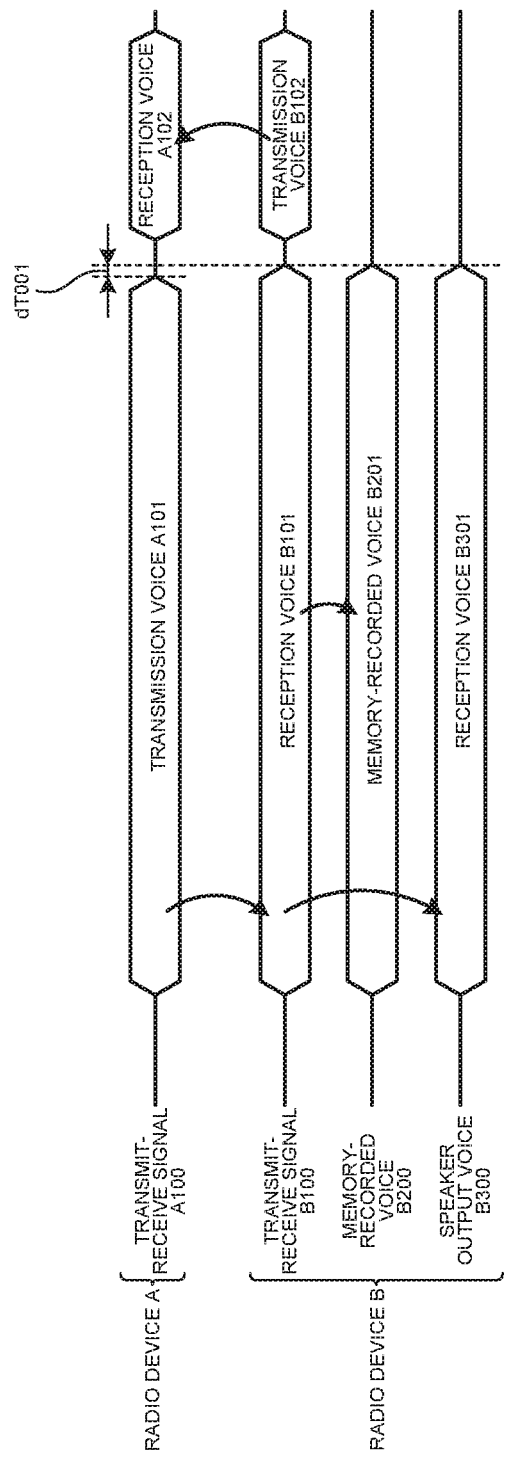
FIG. 2 is a time chart showing an example of a basic action of the radio device according to the embodiment of the present disclosure.

A basic action of the radio device 100 according to the embodiment of the present disclosure is described using FIG. 2. FIG. 2 is a time chart showing an example of the basic action of the radio device 100 according to the embodiment of the present disclosure.

FIG. 2 schematically shows transmission and reception of voice data between a radio device A and a radio device B performing the half-duplex communication. The radio device A is a transmitter side and the radio device B is a receiver side. A transmit-receive signal A100 and a transmit-receive signal B100 express voice data transmitted and received through the transmit-receive antenna 114 shown in FIG. 1. A speaker output voice B300 expresses voice data that is output from the speaker 106 shown in FIG. 1. The radio device A and the radio device B are the radio device 100 shown in FIG. 1.

In the example shown in FIG. 2, the radio device A transmits a transmission voice A101 as a radio wave, and the radio device B receives the transmission voice A101 as a reception voice B101. The radio device B demodulates the reception voice B101 to provide to the receiving side from the speaker 106 as a reception voice B301, and to record in the recorder 110 as a memory-recorded voice B201. At this time, time consumed from transmission until reception includes a delay of time dT001 caused by time for modulation and demodulation processing, time for propagation of a radio wave, and the like. However, the time dT001 is a short period of time in general, and it does not affect transmission of a response after the receiving side recognizes completion of reception (press-to-talk communication). When detecting a time when listening to the reception voice B301 is finished, the receiving side returns a transmission voice B102 according to the contents as a radio wave. The radio device A receives the transmission voice B102 as a reception voice A102. Hereafter, by repeating the press-to-talk communication similarly, conversation between the radio device A and the radio device B is made.

An action of transmitting the under playback signal and the playback end signal, which are a first disclosure, is described using FIG. 3. FIG. 3 is a time chart showing an example of an action of the radio device B performing the rewind playback.

When the receiving side wishes the rewind playback to be performed while listening to the reception voice B101 as a reception voice B302, the receiving side first specifies rewinding time by pressing the rewind playback button 107. This operation causes the radio device B to play back the memory-recorded voice B201 at a point going back by the rewinding time from the point of time when the rewind playback button 107 is pressed from the speaker 106 as a memory playback voice B303. As a result, by the time when the receiving side finishes listening to the reception voice B101, a delay of time dT002 in which a period of time in which the rewind playback button 107 is pressed and a period of time consumed for performing the rewind playback are further added to the time dT001, which is the delay time existing from the beginning is generated. This delay time is not ignorable time, and may cause a trouble in the press-to-talk communication, such as that the sending side cannot wait for a response and retransmits data, because the sender receives no response from the receiving side although the transmission from the sending side has been finished.

According to the present disclosure, the radio device B transmits the under playback signal C101 to the radio device A when the memory playback voice B303 is being played back(rewind playback) at a time T101 at which the reception of the reception voice B101 is finished.

The radio device A receives the under playback signal C101 transmitted by the radio device B as the under playback signal D101. Receiving the under playback signal D101, the radio device A notifies the sending side that the receiving side is during the rewind playback, for example, by outputting a notification tone from the speaker 106, or by displaying a marker indicating that the radio device B is under rewind playback on the display 104. The radio device B transmits the playback end signal C102 to the radio device A at a time 1002 at which the playback of the memory playback voice B303 is finished (when the rewind playback is finished).

The radio device A receives the playback end signal C102 as the playback end signal D102. Receiving the playback end signal D102, for example, the radio device A outputs a notification tone from the speaker 106, or hides the marker indicating that the radio device B is in the rewind playback that has been displayed on the display 104. This configuration enables the radio device A to wait for a response from the radio device B, and receive the transmission voice B102 transmitted by the radio device B as the reception voice A102.

A method of performing rewind playback of the transmit-receive signal B100 and voice data of a memory-recorded voice B200 by the radio device B is described, using FIG. 4, FIG. 5, and FIG. 6. FIG. 4 is a diagram showing voice data. FIG. 5 is a diagram showing a state in which voice data is recorded in the recorder 110. FIG. 6 is a diagram showing a state in which voice data is recorded in the recorder 110.

FIG. 4 shows voice data as discrete data. The transmit-receive signal B100 is constituted of 10 samples of transmit-receive data B110 to B119. The memory-recorded voice B200 is constituted of 10 samples of memory data B210 to B219.

FIG. 5 and FIG. 6 schematically show the recorder 110 in which the transmit-receive data B110 to B119 are recorded. Specifically, at a top of the recorder 110, the transmit-receive data B110 is recorded as the memory data B210, and the transmit-receive data is sequentially stored as memory data. Suppose that the receiving side pressed the rewind playback button 107 at a point of time when time T101 during which the transmit-receive data B110 to B113 have been output from the speaker 106 has passed in FIG. 4. In this case, the recorder 110 has recorded the memory data B210 to B213 as shown in FIG. 5. At this time, a write pointer indicating a write position at which the record controller 111 writes data and a read pointer indicating a position at which the playback controller 109 reads data are both 4.

Furthermore, suppose that the receiving side keeps pressing the rewind playback button 107 for time T102 shown in FIG. 4 and then releases. As a result, the rewinding time is to be time T102, and the playback position of the memory-recorded voice B200 is rewound by time T103 that is the same as the time T102. As shown in FIG. 4, because the time T102 corresponds to two sample time, the write pointer increases to 6, and it becomes a state in which data up to the memory data B215 is recorded as shown in FIG. 6. The read pointer decreases to 2, and playback from the memory data B212 starts. That is, the receiving side can listen to the reception voice again from the memory data B212 at a position rewinding two samples.

At this time, the radio device B has received the transmit-receive data B116, and then keeps receiving data up to the transmit-receive data B119, and finishes the processing. At the same time, the radio device B is outputting the memory data B212, and then keeps outputting the data up to the memory data B219, and finishes the processing. Therefore, the receiving side finishes listening when time T104 has passed after the receiving side released the rewind playback button 107. In this case, the sending side is to wait for a response from the receiving side at least for time T105. Moreover, the speaker output voice B300 during the period of time T102 in which the rewind playback button 107 is kept pressed may be silent, or may be memory data B213R, B212R in which the memory data B212, B213 shown in FIG. 4 are played back in reverse.

Figure 7:
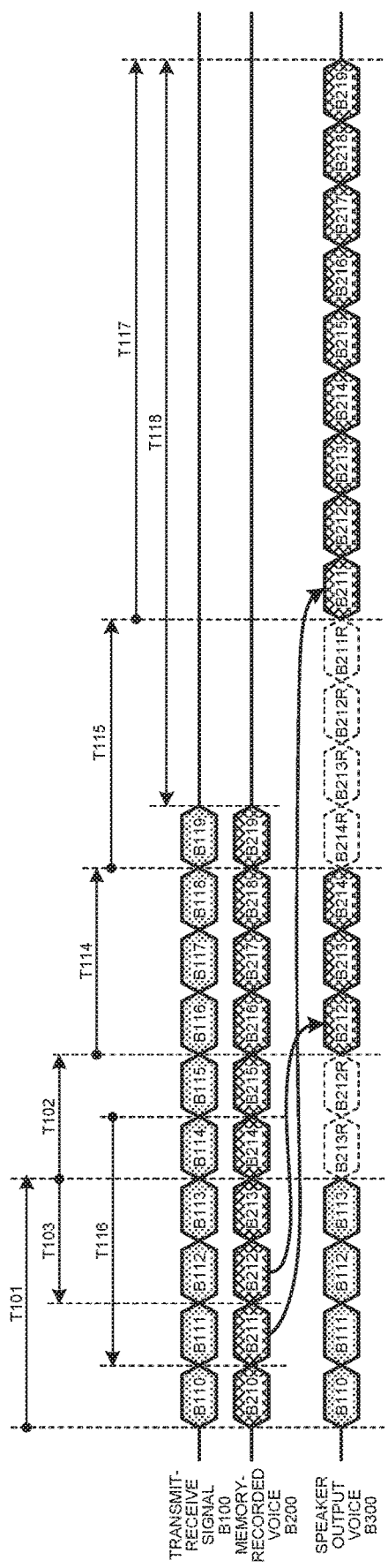
FIG. 7 is a diagram for explaining a method of listening to voice data again.

A method of listening to memory data again during the rewind playback is described using FIG. 7. FIG. 7 is a diagram for explaining a method of listening to memory data again during the rewind playback.

Although detailed description is omitted, as shown in FIG. 7, it is assumed that the rewind playback button 107 is pressed again for time T115 after time T114 in which the rewind playback is performed from the memory data B212 to the memory data B214 in the speaker output voice B300 shown in FIG. 4 has passed. In this case, the read pointer decreases to be rewound by time T116 as long as four samples, which corresponds to the time T115, and listening to the data can be conducted again from the memory data B211. As a result, listening to the data is resumed from the memory data B211, and then listening to the data is finished after time T177, and the sending side is to wait for a response from the receiving side for at least time T118 from completion of reception until completion of listening. Similarly, listening to data can be conducted over again as may times wished, as long as it is during the rewind playback.

For simplicity of description, the rewinding time is assumed to reach the limit when the read point reaches 0, and recording is assumed to be stopped when recorded voice data reaches the end of the memory, supposing that a memory capacity is sufficient for single communication time. However, by considering passing of the write pointer and the read pointer, a loop structure of returning to the top of the memory when the data reaches the end of the memory may be provided. Furthermore, a mechanism to return to the normal transmit-receive mode by ending the rewind playback in the middle may be further provided.

Figure 8:
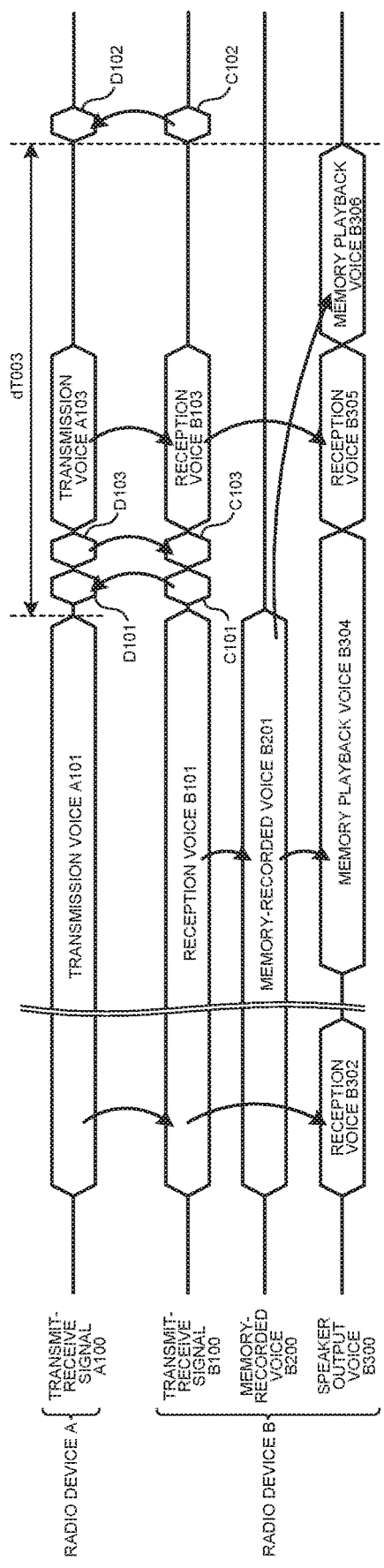
FIG. 8 is a time chart showing an example of an action of interrupt transmission.

An example of an action of interrupt transmission by the radio device A, which is a second disclosure, is described using FIG. 8. FIG. 8 is a time chart showing an example of an action of the radio device A performing the interrupt transmission.

In FIG. 8, when the radio device A receives the under playback signal D101, the sending side can recognize that the radio device B is under rewind playback. The sending side transmits the interrupt signal D103 added to the top of the transmission signal A103 to the radio device B when a matter to be transmitted urgently occurs.

When receiving the reception voice B103 with the interrupt signal C103 added to the top thereof, the radio device B temporarily stops the memory playback voice B304 being played back in the speaker output voice B300. The radio device B then outputs the reception voice B103 as a reception voice B305. When the output of the reception voice B305 is finished, a memory playback voice B306 that is data following the memory playback voice B304 temporarily stopped is output. As a result, the delay time is to be time dT003 to which time for the interrupt reception is added to the time dT002 shown in FIG. 3.

Figure 9:
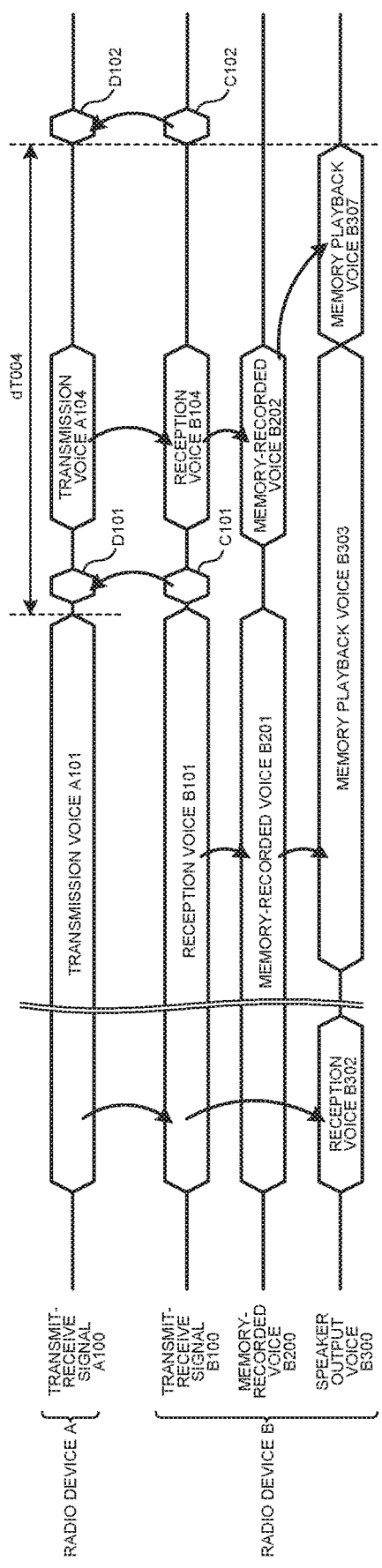
FIG. 9 is a flowchart showing an example of an action of additional transmission.

An example of an action of the radio device A performing the additional transmission, which is a third disclosure, is described using FIG. 9. FIG. 9 is a time chart showing an example of the action of the radio device A performing the additional transmission in the time dT002 in FIG. 3.

In FIG. 9, similarly to the interrupt mode shown in FIG. 8, the radio device A transmits a transmission voice A104 in the time dT002 shown in FIG. 3. However, in the addition mode, the interrupt signal is not added to the top of the transmission voice A104. Because the interrupt signal is not added thereto, even if the radio device B receives the reception voice B104, the radio device B does not output it to the speaker output voice B300. In this case, the radio device B records the reception voice B104 in the recorder 110 as the memory-recorded voice B202, following the memory-recorded voice B201 in the memory-recorded voice B200. As a result, a voice transmitted in the addition mode is provided to the receiver as a memory playback voice B307 to be continued from the memory playback voice B303 in the rewind playback. As a result, the delay time is to be time dT004 in which time consumed for the additional reception is added to the time dT002 shown in FIG. 3.

Moreover, in a firth disclosure, the voice recognition unit 105 converts a voice by which the voice data recorded in sections specified at the time T103 and the time T116 illustrated in FIG. 7 is provided, into a character string. The display displays the character string converted from the voice.

As described above, the present embodiment not only eliminates a trouble in press-to-talk communication even when real time rewind playback is performed in the half-duplex communication, but also enables communication during the rewind playback. Moreover, the present embodiment enables an intuitive operation with a user interface in which rewinding time is specified by duration of depression of the rewind playback button. Furthermore, a portion of data corresponding to a period in which the rewind playback button is pressed is presented as a character string by voice recognition. Therefore, information is visually complemented also.

According to the present disclosure, it is possible to let a party on the other end to know that a past voice is being confirmed without occupying a communication channel, while facilitating confirmation of communication contents, in half-duplex communication. It enables to choose whether to receive communication depending on the necessity for communication of the party on the other end even when a past voice is being confirmed, or to continue the confirmation of the past voice.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A radio device comprising:
   a transmitter that transmits a transmission voice;
   a receiver that receives a first reception voice;
   a recorder that records the first reception voice;
   a playback controller that performs rewind playback of the first reception voice recorded in the recorder as the first reception voice is being received; and
   a transmit-receive controller that causes the transmitter to transmit an under playback signal to notify that the rewind playback is occurring in response to detecting that reception of the first reception voice is completed during the rewind playback, and that causes the transmitter to transmit a playback end signal indicating that the rewind playback is finished in response to determining that the rewind playback is finished,
   wherein
   the transmit-receive controller is further configured to, in response to receipt of a second reception voice that includes an interrupt signal while the rewind playback is occurring, interrupt the rewind playback of the first reception voice and output the second reception voice, and
   in response to completion of the output of the second reception voice, continue the rewind playback to output a remaining portion of the first reception voice that was not output prior to receipt of the interrupt signal.

2. The radio device according to claim 1, further comprising a rewind playback button that executes the rewind playback, wherein
   a time at which the rewind playback is performed is determined according to duration for which the rewind playback button is pressed.

3. The radio device according to claim 1, wherein
   the transmit-receive controller includes a record controller that, in response to receipt of a third reception voice that does not include an interrupt signal while the rewind playback is occurring, causes the rewind playback of the first reception voice to continue, and records the third reception voice in the recorder continuously after the first reception voice recorded in the recorder.

4. The radio device according to claim 3, further comprising a rewind playback button that executes the rewind playback, wherein
   a time at which the rewind playback is performed is determined according to duration for which the rewind playback button is pressed.

* * * * *